United States Patent [19]

Backer et al.

[11] Patent Number: 5,377,119
[45] Date of Patent: Dec. 27, 1994

[54] METHOD FOR OPTIMIZING CASTING CONDITIONS USING PERMEABLE MOLD BY COMPUTER SIMULATION

[75] Inventors: Gerald P. Backer, Mooka; Kimio Kubo, Kawachi, both of Japan

[73] Assignee: Hitachi Metals, Ltd., Tokyo, Japan

[21] Appl. No.: 94,863

[22] Filed: Jul. 22, 1993

[30] Foreign Application Priority Data

Aug. 31, 1992 [JP] Japan .................................. 4-232030
Nov. 4, 1992 [JP] Japan .................................. 4-319458

[51] Int. Cl.$^5$ ............................................. G06F 15/46
[52] U.S. Cl. .................................... 364/476; 364/578; 164/7.1
[58] Field of Search ................. 364/476, 477, 578; 425/135, 149; 164/6, 7.1, 160.1

[56] References Cited

U.S. PATENT DOCUMENTS

| | | | |
|---|---|---|---|
| 4,534,003 | 8/1985 | Manzione | 364/476 |
| 4,742,473 | 5/1988 | Shugar et al. | 364/578 |
| 4,989,166 | 1/1991 | Akasaka et al. | 364/476 |
| 5,031,108 | 7/1991 | Fujita et al. | 364/476 |
| 5,097,432 | 3/1992 | Harada et al. | 364/578 |
| 5,227,979 | 7/1993 | Fukuhira et al. | 364/476 |

FOREIGN PATENT DOCUMENTS

2104464  4/1990  Japan .

*Primary Examiner*—Paul Gordon
*Attorney, Agent, or Firm*—Sughrue, Mion, Zinn, Macpeak & Seas

[57] ABSTRACT

The conditions of casting with a permeable mold having a cavity and a runner can be optimized by a computer simulation method of (1) dividing the mold and a cavity thereof into a plurality of elements; (2) providing mold properties, a pressure and a velocity of a melt flowing into the runner as initial data with respect to each element; (3) performing computations in a stepwise manner to determine the movement of a free surface of the melt and a rate of gas flowing through the mold until the cavity is filled with the melt; (4) calculating a total volume of voids generated in the melt; (5) examining whether or not the total volume of voids is substantially zero; and (6) if the total volume of voids is not substantially zero, repeating the computations with at least one of the initial data modified until the total volume of voids becomes substantially zero.

15 Claims, 7 Drawing Sheets

FIG. 7 t = 0.15 sec.
t = 0.05 sec.
t = 0.25 sec.
t = 0.0 sec.

METHOD FOR OPTIMIZING CASTING CONDITIONS USING PERMEABLE MOLD BY COMPUTER SIMULATION

BACKGROUND OF THE INVENTION

This invention relates to a method of manufacturing articles by a permeable mold casting process, wherein computational procedures are utilized to optimize parameters related to the casting process.

A common practice used to manufacture shaped metallic articles is the casting process, wherein a molten metal is poured into a mold cavity of the desired shape, solidified, and then taken out from the mold. In the production of castings having complex geometry, it is further a common practice to form the mold and cores from sand, which is bound together by inorganic or organic binders such as clays and polymeric resins. Since binders are partially decomposed when exposed to a molten metal at an elevated temperature, the shaped casting can easily be removed from the mold.

Optimizing the process parameters of casting brings about the success of manufacturing high-quality articles. For general casting systems, such parameters include mold shape, mold material, runner shape, and other process variables. Some special process variables should also be included in the specific casting method.

In some cases, it is difficult to cause the molten metal to flow through a series of long thin passages without having the liquid freeze prematurely, causing what is referred to as a "cold shut". In other cases, it is desirable to minimize the volume of metal remaining in the runners used to transport the molten metal from a reservoir to the mold cavity. When either of these considerations is important, recourse is often made to vacuum-assisted casting processes. In such processes, vacuum is applied to a portion of the exterior surface of a permeable sand mold, creating a secondary vacuum of reduced magnitude in the mold cavity, which in turn serves to pull the molten metal into the mold cavity through the runners.

The effectiveness of the vacuum casting processes depends on the mold design, the materials used to make the molds and the processing variables, like other casting methods, and specially depends on the vacuum level. A higher vacuum level applied to the exterior surface of the mold increases the vacuum generated in the mold cavity, which in turn increases the velocity with which the molten metal flows into the cavity. This reduces the amount of time required to fill the cavity and hence reduces the probability of forming cold shuts. However, the increased velocities may result in flow patterns which increase the likelihood of gas entrapment.

For similar reasons, the selection of mold materials is also important. In casting processes where vacuum is not used, a coarse sand will increase the permeability of the mold, thus reducing back pressures in the mold cavity and increasing the rate at which the metal fills the cavity. In vacuum casting processes, a coarse sand will help increase the vacuum levels generated in the mold cavity, with a similarly beneficial effect on fill rates. On the other hand, vacuum casting processes might also use a fine sand of low permeability to cover portions of the mold surfaces where gas might leak into the sand mold from the surrounding atmosphere, again effectively increasing the vacuum generated in the mold cavity.

Previously, the method used to select processing parameters requisite to manufacturing an acceptable casting typically required constructing a mold and attempting to fill it with the molten metal using the casting process of choice. If an excessive amount of gas was entrapped with the solidified metal, then efforts would be needed to reduce this amount by either varying the rates of a molten metal flowing into the mold cavity, or in vacuum casting processes, by varying the vacuum levels applied to the mold. If these variations proved to be unsuccessful, then the more costly alternative of modifying the design of the runners and of the casting shape itself would be necessary.

Therefore, the optimization methods by using computational melt analysis, instead of manufacturing physical mold, have lately attracted considerable attention. A method of computational optimization consists of plural steps, such as assigning mold properties, simulating, filling processes, and detecting the presence or absence of entrapped gas. Mathematical simulations of mold filling processes are usually accomplished via finite difference calculations, in which a mold and a mold cavity are divided by an orthogonal mesh of difference cells (see FIG. 2). A curved boundary 11 is represented by a stair-step grouping of cells 12, and flow calculations are performed only for cells inside the boundary 12. It means that difference cells can exactly represent the mold with straight line boundaries, but they are unsuitable for a mold cavity with curved boundaries. Although the precision of a finite difference method would be increased by using smaller cells, the calculation time will increase much faster than the increase in the number of cells.

Another problem is that, the simulation methods presented previously do not take into consideration the velocity of gas flow through the permeable sand mold to outside but include only a melt flow into a calculation. However, in a case where the melt flow is controlled with the permeability of the mold varied, the speed of a gas flowing out of the mold greatly affects the flow rate of the melt in the mold cavity. Further, in the case of the vacuum casting method, the flow rate of the melt is determined by the rate of a gas flowing out of the mold. That is, the gas flow is considered critical specially in the vacuum casting method using a permeable sand mold.

OBJECT AND SUMMARY OF THE INVENTION

Accordingly, it is an object of the present invention to provide a method of evaluating and optimizing the flow of the molten metal into the mold cavity without the need of physically modifying the mold. More particularly, the present invention seeks to provide a method for selecting optimum combinations of metal flow rates, vacuum degree, mold materials and runner designs in order to reduce the volume of gas trapped within the cast article.

In order to achieve the above-stated object, the present invention provides a mathematical simulation method, whereby the flow patterns of a melt during cavity filling are predicted by the calculus of finite elements. The simulation requires input data in the form of discrete elements which define the geometry of the mold cavity and the mold, along with material constants and process variables. The results of the simulation indicate the flow patterns of the molten metal and are interpreted to calculate the total volume of gas regions which have been sealed off from the permeable sand mold, and thereby remain in the melt. This volume can subsequently be minimized in additional simulations by modifying one or more of the following parameters: a melt flow rate into the runner system, a magnitude of the vacuum applied to the mold, material property constants such as mold or coating permeability and the geometry of the runner system and mold cavity.

Thus, the method of optimizing the conditions of vacuum casting with a permeable mold having a cavity and a runner by computer simulation according to the present invention comprises the steps of:
 (1) dividing the mold and a cavity thereof into a plurality of elements;
 (2) providing mold properties, a vacuum degree and a velocity of a melt flowing into the runner as initial data with respect to each element;
 (3) performing computations in a step-wise manner to determine the movement of a free surface of the melt and a rate of gas flowing through the mold until the cavity is filled with the melt;
 (4) calculating a total volume of any regions of gas which have been separated from the permeable mold and sealed into the melt;
 (5) examining whether or not the total volume of any regions of gas is substantially zero; and
 (6) if the total volume of any regions of gas is not substantially zero, repeating the computations with at least one of the initial data modified until the total volume of any regions of gas becomes substantially zero.

The method of optimizing the conditions of normal-pressure casting with a permeable mold having a cavity and a runner by computer simulation according to the present invention comprises the steps of:
 (1) dividing the mold and a cavity thereof into a plurality of elements;
 (2) providing mold properties, a pressure and a velocity of a melt flowing into the runner as initial data with respect to each element;
 (3) performing computations in a step-wise manner to determine the movement of a free surface of the melt and a rate of gas flowing through the mold until the cavity is filled with the melt;
 (4) calculating a total volume of any regions of gas which have been separated from the permeable mold and seated into the melt;
 (5) examining whether or not the total volume of any regions of gas is substantially zero; and
 (6) if the total volume of any regions of gas is not substantially zero, repeating the computations with at least one of the initial data modified until the total volume of any regions of gas becomes substantially zero.

DETAILED DESCRIPTION OF THE INVENTION

Figure 2:
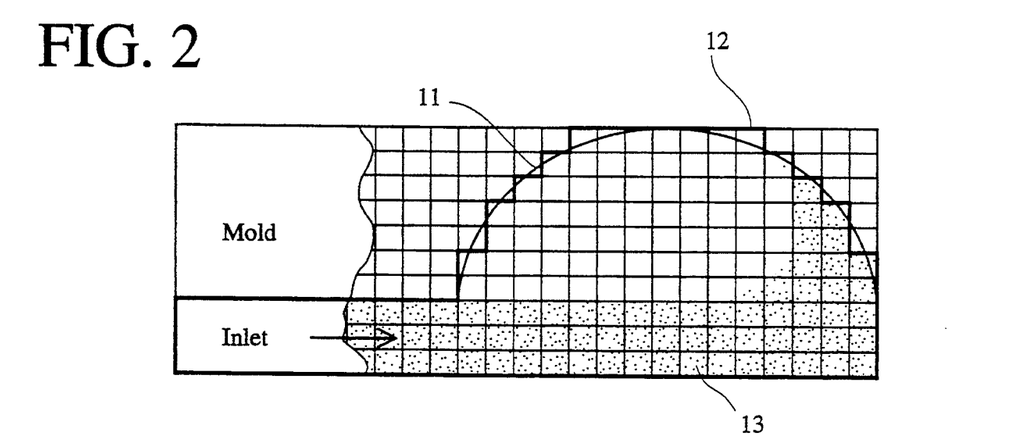
FIG. 2 is a schematic view showing a semi-circular mold cavity divided by a finite difference mesh and containing a molten metal expressed by a MAC method.
Figure 3:
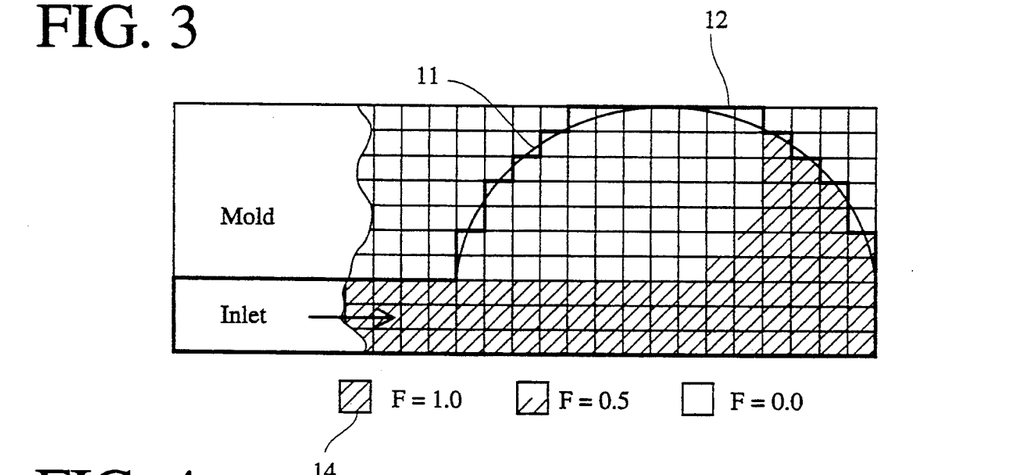
FIG. 3 is a schematic view showing a semi-circular mold cavity divided by a finite difference mesh and containing a molten metal expressed by a VOF method.
Figure 4:
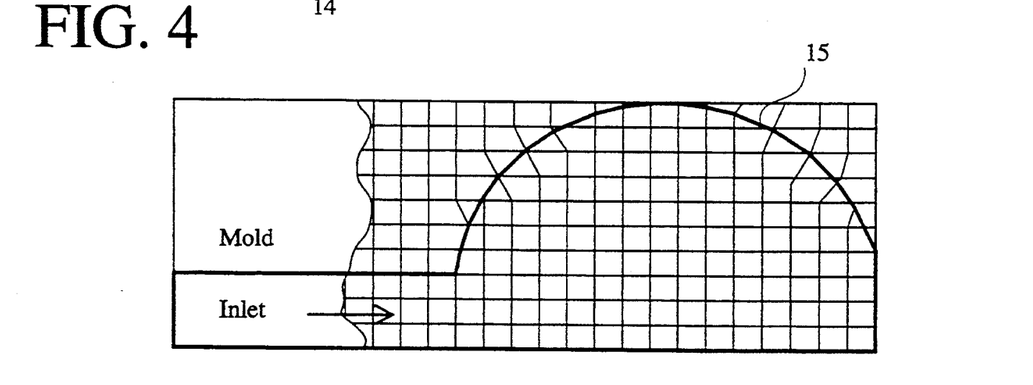
FIG. 4 is a schematic view showing a semi-circular mold cavity divided by a finite difference mesh.

Mathematical simulations of mold filling processes are usually accomplished via finite difference calculations, in which a mold and a mold cavity are divided by an orthogonal mesh of difference cells (see FIGS. 2 and 3). A curved boundary 11, is represented by a stair-step grouping of cells 12, and flow calculations are performed only for cells inside the boundary 12. The interface between the melt entering the mold cavity and the gas being displaced is commonly referred to as the free surface, and can be distinguished by one of two methods: (1) a Marker and Celt (MAC) method, wherein markers 13 are moved with the melt velocities and their absence in a given region denotes the absence of melt in that region, or (2) a Volume of Fluid (VOF) method, in which each finite difference cell 14 is assigned a melt fraction F between 0.0 and 1.0, corresponding to the volume fraction of that cell occupied by the melt. Finite element simulations of mold filling processes are not common, but are preferable under circumstances where an accurate geometrical representation is required due to their capacity for using arbitrarily shaped elements 15 (see FIG. 4).

Figure 1:
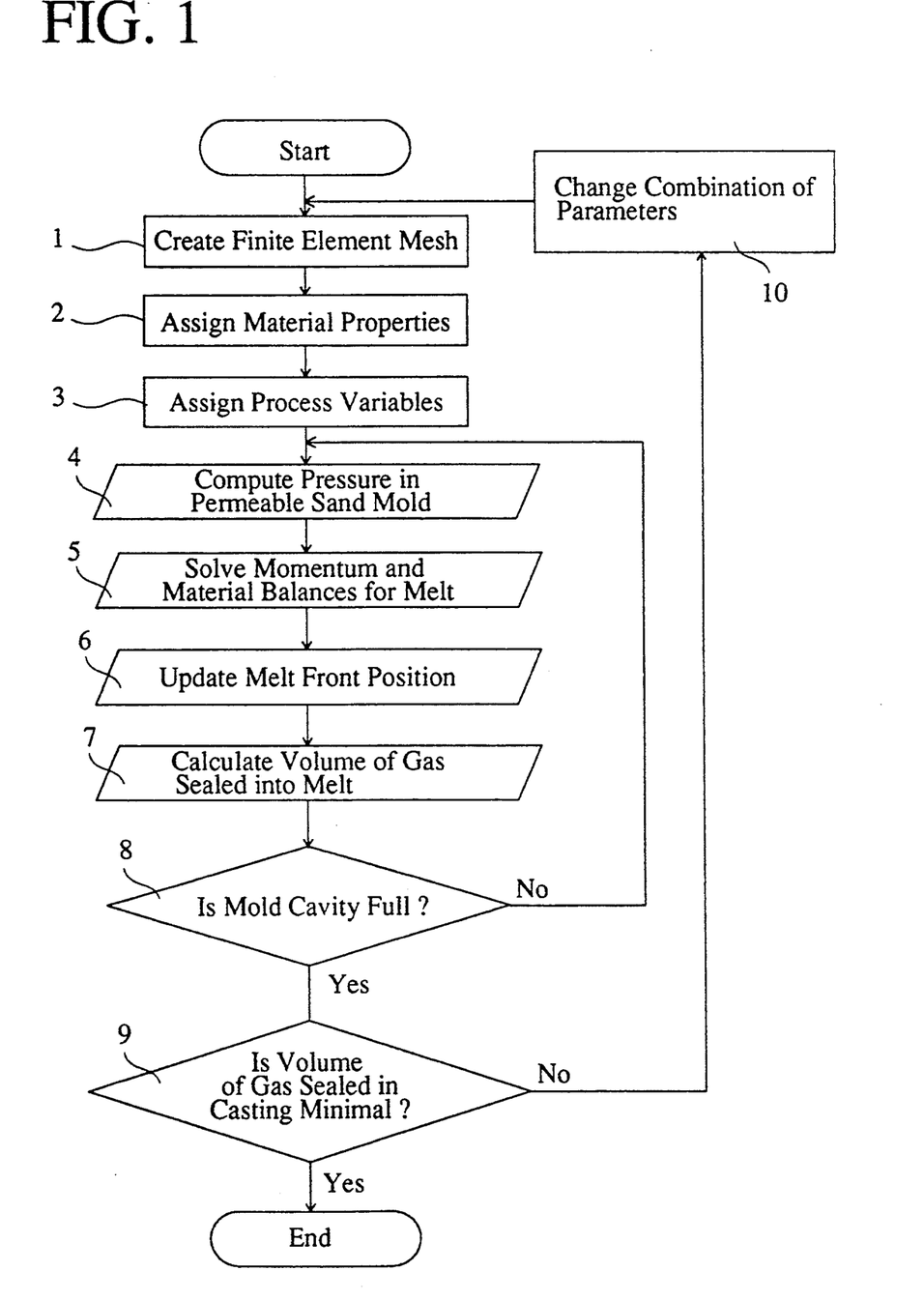
FIG. 1 is a flowchart of computations for determining the total volume of gas sealed into the melt during the mold filling process.

A preferred embodiment of the present invention employs the finite element method coupled to the VOF front tracking method to carry out a simulation of the mold filling process according to the steps outlined as follows (see FIG. 1):
 (1) Create the finite element mesh defining the shape of a mold and a mold cavity;
 (2) Assign material properties;
 (3) Assign process variables;
 (4) Compute the pressure in the permeable sand mold;
 (5) Solve the momentum and material balances for the melt;
 (6) Update the melt front position;
 (7) Calculate the volume of gas remaining in the mold cavity;
 (8) Iterate steps 4 to 7 until the mold cavity is filled;
 (9) Calculate the volume of gas sealed in the casting articles;
 (10) Iterate steps 1–9 with modified process parameters (shapes of a mold and a mold cavity, permeability and material of mold, vacuum degree, shape of runner, etc.), until the volume of gas sealed is minimized.

The details of the process will be described below. For purposes of providing a detailed description of the procedure, reference is made to the geometry depicted in FIG. 5. Such a geometry is of a nature corresponding to processes referred to as counter-gravity processes. However, the procedures described in this preferred embodiment are equally applicable to any one of vacuum and normal-pressure casting processes. The symbols and nomenclature used are given in Table 1.

TABLE I

| | Nomenclature |
|---|---|
| F | Melt fraction in each element. |
| g | Gravity vector (x, y, z components). |
| n | Direction normal to the melt surface. sand mold. |
| P | Pressure of melt. |
| $P_M$ | Gas pressure within the permeable mold. |
| $P_V$ | Void region pressure (pressure of gas sealed into the melt. |
| t | Time (also as superscript). |
| $t_0$ | Initial time. |
| $v_M$ | Velocity vector of the gas within the permeable mold (x, y, z components). |
| v | Velocity vector of the melt (x, y, z components). |
| v' | Trial velocity vector of the melt at "t + $\Delta$t". |
| $V_l$ | Void region volume loss. |
| $V_y$ | Void region volume. |
| [C] | Convection matrix. |
| [G] | Gradient matrix. |
| [M] | Mass matrix. |
| [K] | Stiffness matrix. |
| $[G]^T$ | Gradient matrix transpose. |
| $\mu$ | Viscosity of the melt. |
| $\rho$ | Density of the melt. |
| $\alpha$ | Permeability coefficient of the mold. |
| $\Gamma$ | Boundary surface area between the mold and its cavity. |
| $\Delta t$, $\Delta t_s$ | Time increments for solution and data storage. |

(1) Creation of the finite element mesh.

Figure 5:
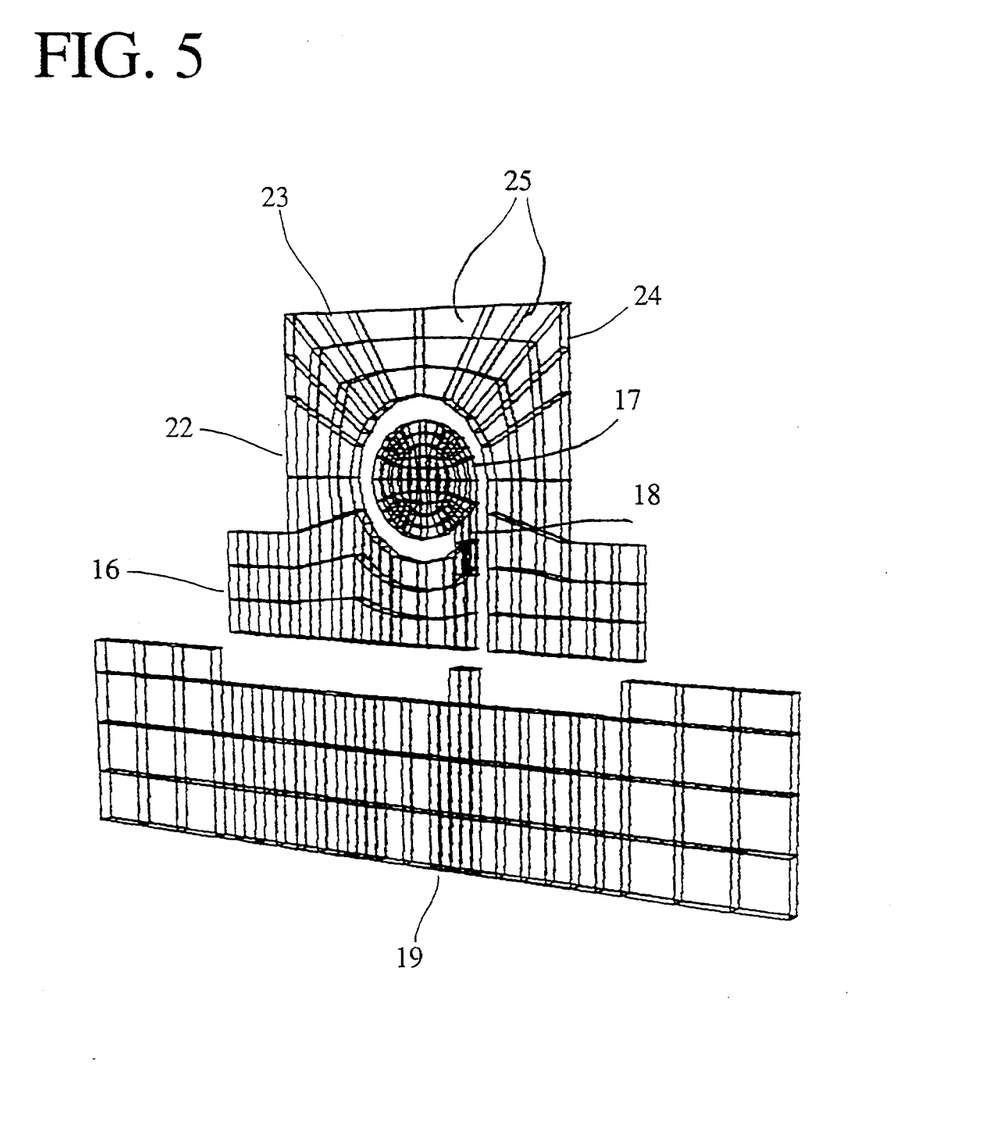
FIG. 5 is an exploded schematic view showing a divided finite element mesh which comprises three geometrical regions of a disc-shaped mold cavity, a permeable sand mold, and a reservoir of a molten metal below the mold.
Figure 6:
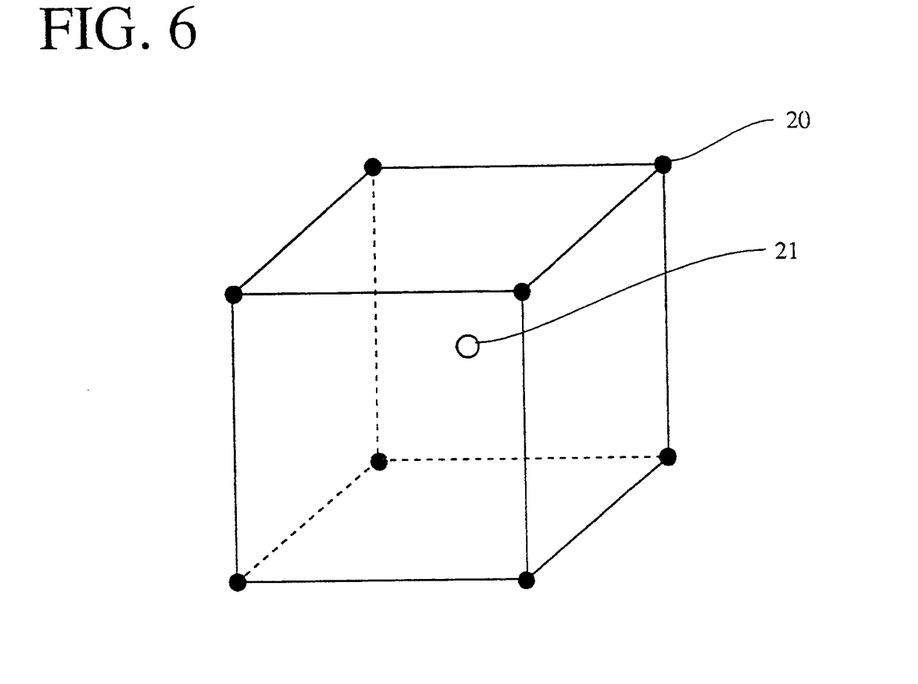
FIG. 6 is a schematic view showing a hexahedral element with corner nodes and a center as data storage locations.

The geometry of the mold 16, the mold cavity 17, the runner system 18, and optionally, a reservoir 19 of a molten metal from which the melt is drawn into the mold cavity 17 are spatially represented by arbitrarily shaped hexahedral elements, as shown in FIG. 5. Notwithstanding the use of hexahedral elements in FIG. 5, it is evident that wedge and tetrahedral elements could also be used to spatially divide the geometry without nullifying the procedures disclosed herein. Data for melt velocities v are defined at the corner nodes 20 of each element, while pressures P, melt fractions F and a normal "n" defining the orientation of the interface between the melt and the gas are all defined at the center 21 of each element, constituting a conventional unequal order interpolation finite element formulation (see FIG. 6).

(2) Assignment of material properties

Constant values of viscosity $\mu$ and density p are assigned to the melt. A permeability coefficient $\alpha$ is assigned to the permeable sand mold, such that a flow of gas through the mold can be accurately modeled by the following relation for viscosity-dominated flow through porous media.

$$\Delta P_M = -\alpha . v_M \quad (1)$$

The permeability coefficient $\alpha$ of the mold may be spatially non-uniform to represent different materials of construction used for the sand mold. Furthermore, a permeability coefficient $\alpha$ may be assigned to coverings placed on the exterior surface of the mold. Such coverings may consist, for example of sheets of metal, fine clays or polymeric binders with inorganic fillers which have been applied in a liquid form and subsequently cured or dried, and are used for the express purpose of blocking the leakage of gas into the sand mold from the surrounding atmosphere in vacuum casting processes.

(3) Assignment of process variables

Under conditions where the geometry of the mold cavity and runner system have been specified, the process variable which has traditionally been of principal interest in permeable mold casting processes is the rate at which the molten metal flows into the runner system. This flow rate of the molten metal can be controlled in a variety of manners: by choking the flow through an orifice prior to the runner system or by reducing the external pressure applied to the molten metal through pneumatic, electromagnetic or hydrostatic means. Such process variables can be represented by boundary conditions on velocity and pressure, and are a conventional practice in finite element melt flow analyses.

In the present invention, an additional variable is specified: for instance, the pressure acting on the external surfaces of the permeable mold may be taken into consideration in the vacuum casting method shown in FIG. 5. In vacuum casting processes, the external vacuum and the secondary vacuum generated in the mold cavity may constitute the principle means of accelerating the molten metal into the mold cavity, hence an accurate representation of the pressure on the external surface of the mold is vital to the computer simulation of the flow dynamics. In normal-pressure casting processes, the pressure acting on the mold external surfaces is usually specified to be atmospheric.

(4) Computation of the pressure in the permeable sand mold.

Given the material properties and the process variables assigned in a manner which accurately represents the conductions existing in a physical apparatus, the first computational procedure consists of a calculation of the pressures existing in the sand mold.

$$\Delta^2 P_M = 0 \quad (2)$$

In effect, a steady state analysis is applied to the flow of gas through the permeable sand mold between the mold cavity and the atmosphere outside the mold. This is a reasonable approximation for two reasons. First, the density of the gas flowing through the permeable sand mold is quite low, thus inertial and gravitational terms are negligible in comparison to the pressure gradients and viscous terms in the equation (1). Second, the pressures in the sand mold are usually nearly atmospheric and gradients in the pressure are relatively small, thus the continuity equation for the gas phase can be approximated by $$\Delta . v_M = 0 \quad (3)$$

Under conditions where the latter assumption is not valid, i.e., the vacuum levels are relatively high, the pressures in the sand mold can be approximated by $$\Delta^2 P_M = -(\Delta P_M)^2 / P_M \quad (4)$$

which expression is derived from the continuity equation for compressible fluids. When the vacuum level is low (for instance, pressure reduction is less than 200 mmHg), the gas flow is nearly in a steady state, and the pressure is solved by the equation (2). When the vacuum level is high (for instance, pressure reduction is higher than 200 mmHg), the equation (4) is used instead of the equation (2).

(5) Solving the momentum and material balances for the melt.

The second computation requires a solution to the three-dimensional Navier-Stokes equations for the melt phase.

$$\rho \frac{\delta v}{\delta t} = -\nabla P + \mu \nabla^2 v - \rho v b \cdot \nabla v + \rho g \quad (5)$$

The velocities are incremented over successive time steps by an explicit finite element matrix equation derived, for example, from a conventional Galerkin integration.

$$[M]\{v'\} = [M]\{v^t\} + \frac{\Delta t}{\rho} [-[K]\{v^t\} + [C]\{v^t\} + \rho g] \quad (6)$$

Since the relation derived from the Navier Stokes equations provides a trial solution vector $\{v'\}$ at the time step "$t+\Delta t$" for the velocity data only, a supplementary equation for pressure is derived from the continuity equation for incompressible fluids as $$\Delta^2 P = \Delta \cdot v' \quad (7)$$

and is solved via the following finite element matrix equation, subject to boundary conditions consisting of the pressure in the gas phase in the mold cavity and the boundary conditions determined in step 3.

$$[G]^T[M]^{-1}[G]\{P\} = [G]\{v'\} \quad (8)$$

The correct velocities $\{v^{t+\Delta t}\}$ at the new time step "$t+\Delta t$" can be calculated by taking into consideration the pressure $\{P\}$ of the melt from the following equation:

$$[M]\{v^{t+\Delta t}\} = [M]\{v' - \frac{\Delta t}{\rho} [G]\{P\} \quad (9)$$

Other computational procedures for the Navier-Stokes equations are also known in the finite element art and can readily be applied in lieu of the preferred embodiment described above.

(6) Updating the melt front position.

The computational procedure described in step (5) will result in a vector of nodal velocities for the melt elements. The relative amounts of melt and gas in each of the elements can then be updated over successive time increments from a convective balance for the volumetric melt fraction F, $$\frac{\delta F}{\delta t} + v^{t+\Delta t} \cdot \nabla F = 0 \quad (10)$$

While this equation can be solved by a finite element calculation, the preferred embodiment includes a calculation of the volumetric flow rate of the melt through each inter-element boundary. By summing the change in the volume of the melt contained in each element, a new interface position between the melt and air in the mold cavity can be identified. This position can then be utilized as the location where new pressure boundary conditions on the melt are implemented in a new time step. The procedure outlined above constitutes the Volume of Fluid (VOF) method developed for finite difference calculations (see C. W. Hirt and B. D. Nichols, J. Computational Physics 39, pp 201-225 (1981)); its use here in a finite element method is thought to be unique, but is relatively straightforward.

(7) Calculation of the volume of gas remaining in the mold cavity.

The final computation at a given time comprises a series of calculations aimed at an accurate determination of the volume of gas remaining in the mold cavity. First, a calculation must be performed to determine the volumetric flow rate of gas which passes from the mold cavity into the permeable sand mold. Since the pressures in the permeable mold are known, the volumetric flow rate is calculated from $$V_l = \left[ \int_\Gamma -\frac{1}{\alpha} \nabla P_M \cdot n d\Gamma \right] \Delta t \quad (11)$$

where the summation is carried out over all the element surfaces which are in contact with both the mold cavity and the permeable sand mold.

Figure 8:
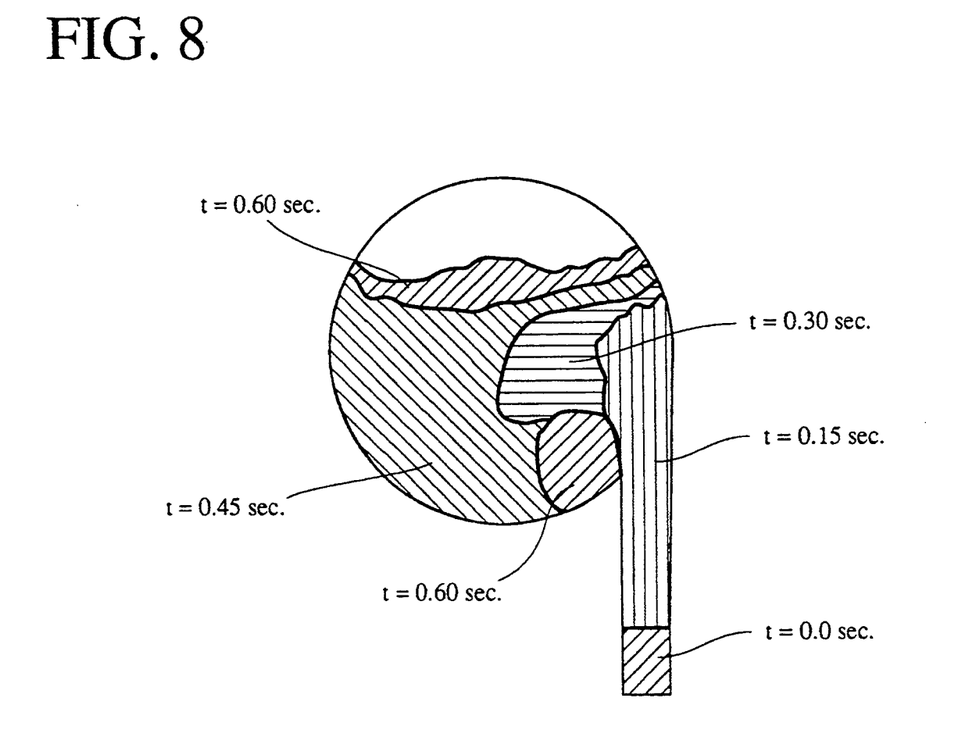

A second calculation is then performed to determine the volume of gas remaining in the mold cavity. In FIG. 8, only one discrete contiguous region of gas is shown. However, since the flow patterns of the melt into the mold cavity may produce a multiplicity of discrete regions, the preferred embodiment treats each discrete region separately. In other words, a volumetric flow rate of gas into the sand mold is calculated separately for each discrete region, along with the actual volume contained within each discrete region of gas at time "$t+\Delta t$".

The third calculation in the series consists of a computation of a spatially invariant pressure for each discrete region of gas.

$$P_\gamma^{t+\Delta t} V_\gamma^{t+\Delta t} = P_\gamma^t (V_\gamma - V_l)^t \quad (12)$$

Though it is assumed that the pressure change occurs under isothermal conditions, an adiabatic change of state may also be used to compute the pressures. The pressures determined for each region of gas constitute a boundary condition applied to the interface between the melt and „as in step (5).

(8) Iteration until the mold cavity is full.

The mold region pressures, the melt momentum and mass balances, the melt front position and the volumes of gas in the mold cavity are iteratively calculated according to the steps 4 to 7 in successive time increments until the mold cavity has been filled with the melt and the regions of gas which have been sealed into the melt, such that the net flow of melt into the mold cavity is zero. Time increments $\Delta t$ for this procedure are chosen in a manner which preserves the dynamic stability of the finite element calculations in accordance with well known practices in the art (see P. J. Roache, *Computational Fluid Mechanics*, Hermosa Publishers, Albuquaerque (1982)). Since the time increments for the iterative computations can be small relative to the total time required to fill the mold cavity, a substantial amount of numerical data can be generated. A second time step, $\Delta t_s$, is therefore defined at which the numerical data to be evaluated by the analyst is written to computer storage devices. The preferred region of time step, $\Delta t_s$, is $\frac{1}{2}$ to 1/100 of total time for filling.

(9) Calculation of the volume of gas sealed in the casting articles.

Upon completion of the above-listed series of calculations for a given time increment, the analyst will have available sufficient data to characterize the flow patterns in terms of their propensity to seal volumes of gas into the melt. In particular, if there is a discrete contiguous region of gas for which a volume and a non-zero pressure have been calculated, and the volumetric flow rate of gas into the permeable mold is determined to be zero by virtue of the fact that no surface area between the region of gas and the permeable mold exists, then clearly, such a region of gas will have been sealed into the melt. It is, of course, possible that such a sealed region of gas can reconnect itself to the permeable mold with no deleterious consequences to the homogeneity of the casting. However, it often happens that the region of gas remains sealed within the melt for a time extending through the solidification of the casting to the extent that it forms a void region in the solidified casting. The judgment of unfavorable gas regions existing in the casting is proceeded by examining images of the simulation results displayed as two- or three- dimensional pictures. If no unfavorable gas region was considerable, then the optimization of process parameters is successful.

Such unfavorable void regions can be variously referred to as "blowholes", "pinholes" or "trapped gas", and can be unacceptable insofar as they disrupt the homogeneity of the metal casting. The minimization of the volume of gas sealed into the melt during the mold filling sequence is clearly a desirable feature.

(10) Iteration with modified process parameters, until the volume of gas sealed is minimized.

In order to achieve this, the analyst can repeat the simulation described in steps 1–9 above with a variety of material constants, process variables and design geometry modified, and select the combination of parameters which produces a minimum volume of gas sealed into the melt. It is, of course, possible to utilize optimization procedures based on systematic variations in the process parameters of interest and from a display of the volume of gas sealed into the melt as a dependent function of the process parameters, choose via interpolation a set of optimum process parameters. Such procedures constitute "designed experiments," and a variety of techniques can be devised for structuring the selection of the process parameters to be examined, and for interpolating the results to select a set of optimum process parameters. All such variations and deviations, though not detailed in the preferred embodiment hereinabove and the examples hereinunder, should not be considered as limiting the spirit or scope of the present invention, insofar as this is defined solely by the appended claims.

The method of the present invention has been explained in detail with reference to the vacuum casting method, but it should be noted that it is applicable to any other casting methods such as a normal-pressure casting method. Though FIG. 5 shows a two-dimensional analysis of a disc-shaped casting, the method of the present invention is applicable to any other shapes of castings for three-dimensional analysis.

The present invention will be described in further detail by ways of the following Examples.

EXAMPLE 1

The casting and mold geometry used in this Example are identical to those shown in FIG. 5, representing a counter-gravity casting process in an air atmosphere. The molten metal being cast is a steel alloy, for which physical properties are shown in Table 2. Dimensions for the geometry and a set of additional process parameters are also included in Table 2. Subsequent alterations of the process parameters made to explore their effect on the volume of air sealed into the melt will be clearly indicated and are therefore not further listed.

TABLE 2

| Simulation Parameters | |
| --- | --- |
| $\mu$ | 0.08 g/cm · sec |
| $\rho$ | 7.8 g/cm$^3$ |
| $\alpha$ | 0.001 g/cm$^2$ · sec |
| Cavity radius | 2.0 cm |
| Mold height | 8.0 cm |
| Mold width | 8.0 cm |
| Mold thickness | 0.4 cm |
| Runner width | 0.6 cm |
| Applied vacuum | −150 mm Hg |

The sequence of events in the process proceeds as follows: Initially, the pressure in the mold cavity is assumed to be atmospheric (1.0 Mpa) and a hydrostatic pressure gradient exists in the melt. At some time $t_0$, following the placement of the sand mold onto the surface of the molten metal, the vacuum is applied to the external surfaces of the mold. Air is permitted to leak into the mold through the indicated side surfaces 22–24, while the front and back surfaces 25 of the three-dimensional geometry are covered with a less-permeable means such as a metal sheet or other impermeable solid materials. Due to the application of vacuum to the external surface of the mold, a gradient of pressure is generated in the sand mold, which in turn, induces a certain flow of air from the mold cavity into the permeable sand mold. The loss of air from the mold cavity generates a suction which draws the melt up through the runner 18 into the mold cavity 17 against the force of gravity.

Figure 7:
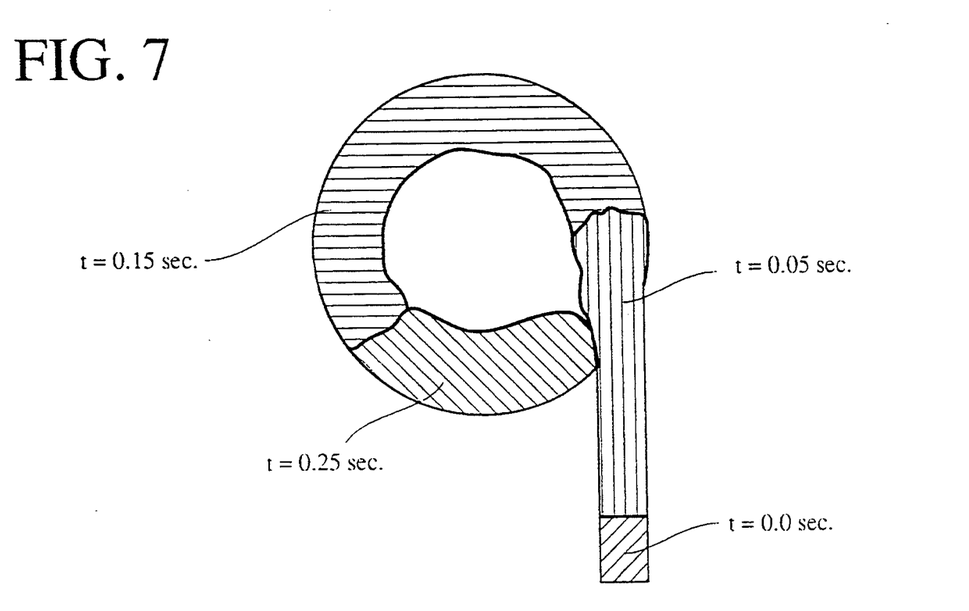
FIGS. 7, 8, 9, and 10 are schematic views showing melt flow patterns depicted as melt fraction (F) contours during mold filling in Examples 1-4, representing a vacuum casting process.

Contour drawings of the melt fraction F are demonstrated at four selected time intervals in FIG. 7. Consequent to the relatively high vacuum applied to the external surface of the mold, the melt accelerates rapidly into the mold cavity, and circulates around the circumference of the disc-shaped mold cavity. In FIG. 7, it is clear that a region of air has been sealed into the melt, as it is completely cut off from the mold cavity surface at t=0.25 seconds. The volume of air sealed into the melt was calculated to be 1.15 cm$^3$ (nearly 25% of the entire cavity volume) at a pressure of 1.0 MPa. Such a geometry and selection of process parameters would therefore create circumstances under which gas voids could be produced in the solidified casting, and would not be recommended for a manufacturing process.

EXAMPLE 2

The second Example demonstrates how a modification to the magnitude of the vacuum applied to the external surface can be used to generate a mold filling sequence which would have a much lower potential for void formation in the same mold as in Example 1. A reduction in the applied vacuum level from −150 mm Hg to −30 mm Hg causes the melt to flow into the mold cavity at a significantly reduced rate. Please refer to FIG. 8. In this sequence, gravity forces the melt to fall back upon itself immediately after it has entered the mold cavity, thus filling the casting from the bottom upwards. While two distinct regions of air exist at t=0.45 seconds (one next to the runner), at no time is a region of air sealed into the melt, thus this combination of process parameters would be considered appropriate for the casting geometry.

EXAMPLE 3

The third Example demonstrates how the design of the runner may be modified to reduce the volume of air sealed into the melt in the same mold as in Example 1. The dimensions of the mold and the mold cavity are maintained at constant values, but the runner is shifted from the side of the disk-shaped mold cavity to the center of the cavity. Furthermore, the runner is tapered from a width of 0.8 cm to 1.0 cm where it contacts the mold cavity. The vacuum applied to the mold external surface is identical to that in Example 1.

Figure 9:
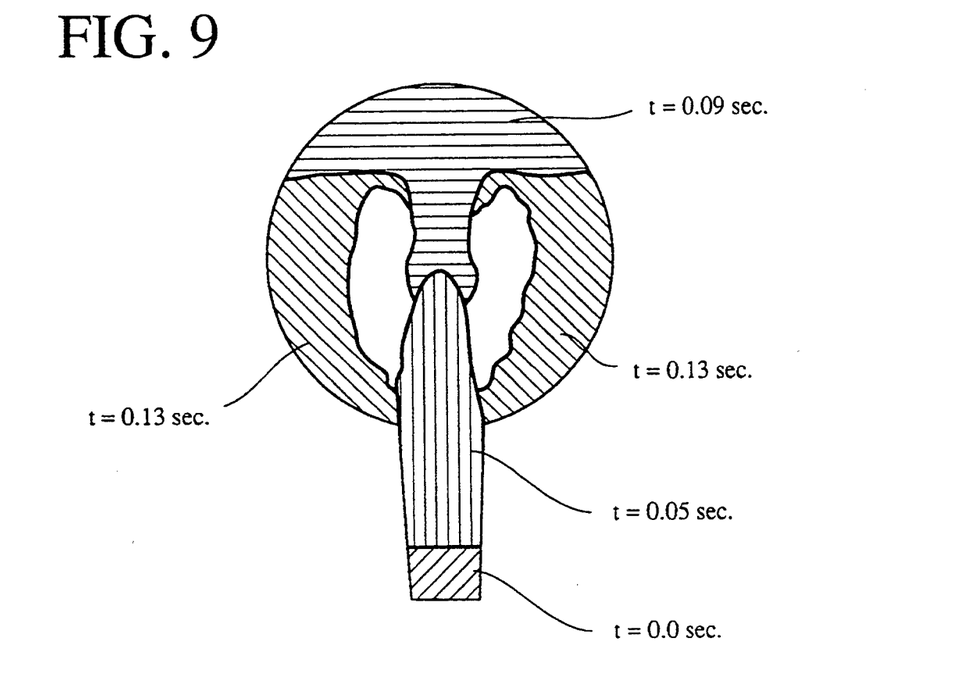

In the simulated mold filling sequence as shown in FIG. 9, the melt again rapidly flows into the mold cavity from the center runner. In this simulation, however, the melt separates into two streams when it contacts the top of the mold cavity, each of which subsequently seals a volume of air away from the surface of the mold cavity. The volume of air which is sealed into the melt is 1.05 cm$^3$, slightly smaller than that calculated in Example 1. While this combination of process parameters cannot be considered satisfactory, it is improved over the initial selection.

EXAMPLE 4

Figure 10:
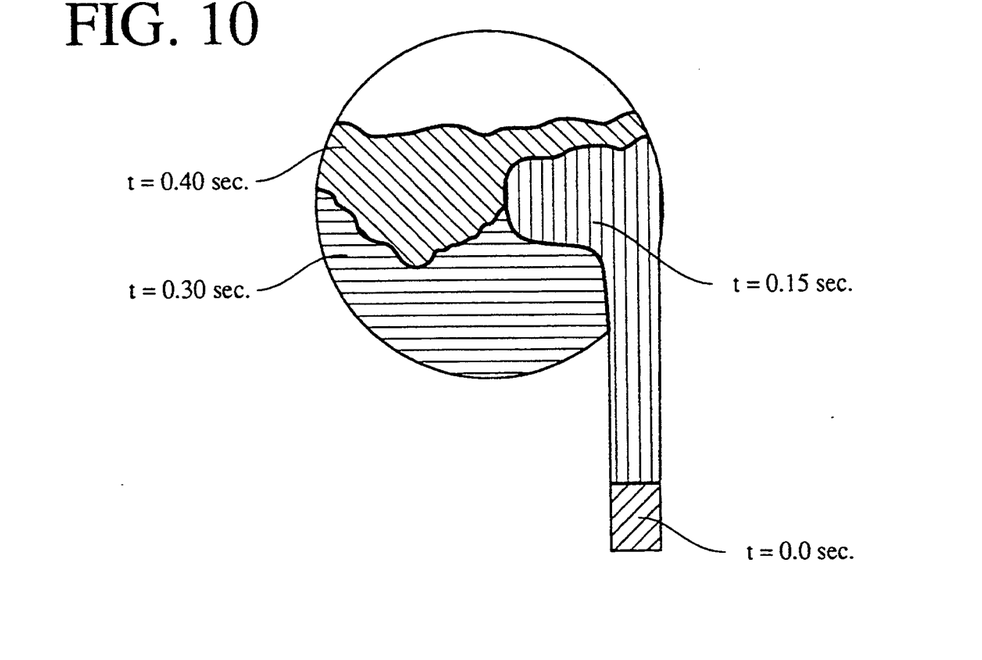

The fourth Example examines the use of a coating to modify the pressure gradients existing in the permeable sand mold, and thereby modify the patterns of the melt flow into the mold cavity. The conditions of Example 1 are reproduced, with the exception that the impermeable solid material on the front and back surfaces 25 of the sand mold is replaced with a coating of 1 mm thickness having a permeability coefficient of 0.0002. The impermeable solid material is retained on the front and back surfaces of the mold cavity and liquid reservoir to confine the molten metal. As a result of the air leaking into the mold through the coating, the flow rate of the molten metal is much reduced as shown in FIG. 10. As in Example 2, no regions of air are sealed into the melt, thus this combination of process parameters can also be considered satisfactory.

EXAMPLE 5

Figure 11:
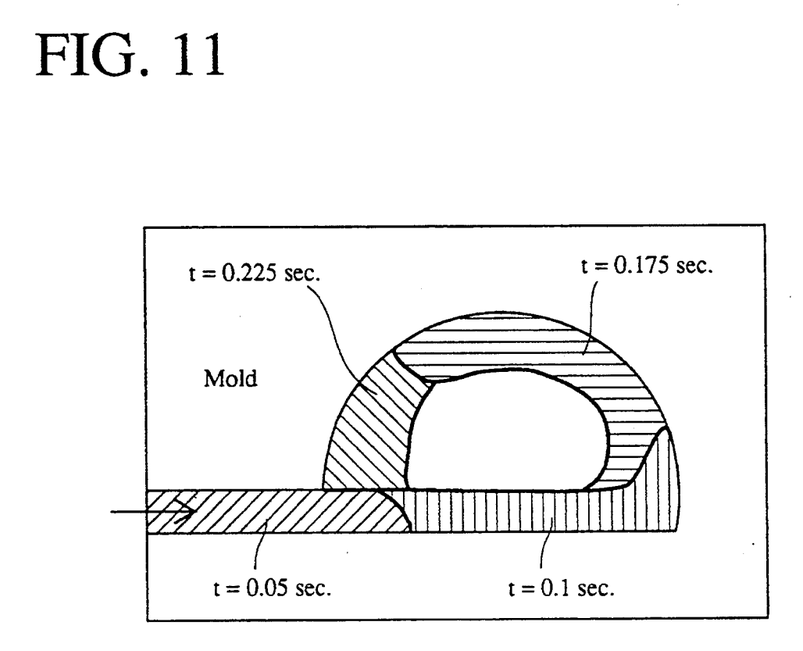
FIGS. 11 and 12 are schematic views showing melt flow patterns depicted as melt fraction (F) contours during mold filling in Examples 5 and 6, representing a casting process without vacuum.

The fifth Example demonstrates the use of the analysis procedure to modify process variables in a non-vacuum casting process. In this Example, molten steel flows into the geometry shown in FIG. 11 at a volumetric flow rate of 60 cm$^3$/sec. Atmospheric pressures are assigned to the top and side surfaces of the mold, while the front, back and bottom surfaces are assumed to be covered with an impermeable solid material. Additional simulation parameters for this Example are listed in Table 3. The relatively high flow rate of molten steel into the runner system causes the melt to trap a gas region of 5.2 cm$^3$ at t=0.2 seconds.

TABLE 3

| Simulation Parameters | |
|---|---|
| $\mu$ | 0.08 g/cm · sec |
| $\rho$ | 7.8 g/cm$^3$ |
| $\alpha$ | 0.001 g/cm$^2$ · sec |
| Cavity radius | 4.0 cm |
| Mold height | 9.0 cm |
| Mold width | 14.0 cm |
| Mold thickness | 0.5 cm |
| Runner width | 1.0 cm |

EXAMPLE 6

Figure 12:
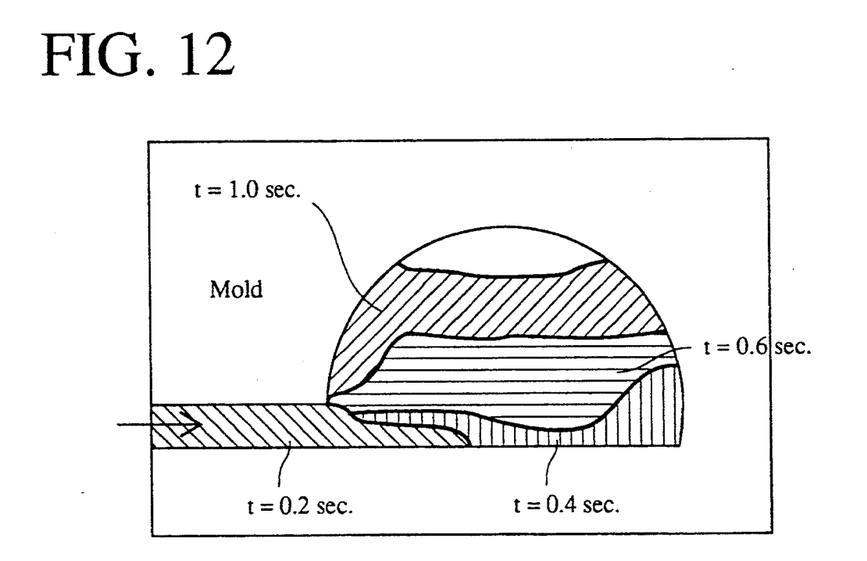

The final Example demonstrates how a modification to the magnitude of the volumetric flow rate can be used to generate a mold filling sequence which would have a much lower potential for void formation. By reducing the volumetric flow rate into the runner system from 60 cm$^3$/sec of Example 5 to 30 cm$^3$/sec, the casting fills from the bottom up without trapping any gas regions as shown in FIG. 12.

As described above in detail, the method of simulating a casting process with a permeable mold according to the present invention can exactly evaluate without suffering from a lengthy computation whether or not a permeable mold having a certain shape and design is capable of producing cast articles substantially free from voids. Also, the method of the present invention is effective to determine process variables such as a vacuum degree, a melt velocity, etc. for a given mold design. The easy determination of the vacuum degree is significant particularly in the case of a vacuum casting method. The method of the present invention having such advantages can be applied to mold casting processes with various mold designs.

What is claimed is:

1. A method of optimizing the conditions of vacuum casting with a permeable mold having a cavity and a runner by computer simulation comprising, the steps of:
   (1) dividing said mold and a cavity thereof into a plurality of elements;
   (2) providing mold properties, a vacuum degree and a velocity of a melt flowing into said runner as initial data with respect to each element;
   (3) performing computations in a step-wise manner to determine the movement of a free surface of said melt and a rate of gas flowing through said mold until said cavity is filled with said melt;
   (4) calculating a total volume of any regions of gas which have been separated from said permeable mold and sealed into said melt;
   (5) examining whether or not said total volume of any regions of gas is zero; and
   (6) if said total volume of any regions of gas is not zero, repeating said computations with at least one of said initial data modified until said total volume of any regions of gas becomes zero.

2. The method according to claim 1, wherein said initial data modified in said step (6) for repeating the computations include a vacuum degree.

3. The method according to claim 1, wherein said initial data modified in said step (6) for repeating the computations include a shape of said runner.

4. The method according to claim 3, wherein the initial data of shapes of said mold, said cavity and said runner are also given with respect to each element, and includes areas of interfaces between said mold and said cavity and said runner.

5. The method according to claim 1, wherein the initial data of said mold properties include a permeability of said mold.

6. The method according to claim 5, wherein said initial data modified in said step (6) for repeating the computations include the permeability of said mold, which is modified by providing at least part of an external surface of said permeable mold with a less-permeable material.

7. The method according to claim 5, wherein said initial data modified in said step (6) for repeating the computations include the permeability of said mold, which is modified by changing the size of sand grains and a binder constituting said mold.

8. The method according to claim 1, wherein said initial data modified in said step (6) for repeating the computations include said velocity of the melt flowing into said runner.

9. A method of optimizing the conditions of normal-pressure casting with a permeable mold having a cavity and a runner by computer simulation, comprising the steps of:

(1) dividing said mold and a cavity thereof into a plurality of elements;

(2) providing mold properties, a pressure and a velocity of a melt flowing into said runner as initial data with respect to each element;

(3) performing computations in a step-wise manner to determine the movement of a free surface of said melt and a rate of gas flowing through said mold until said cavity is filled with said melt;

(4) calculating a total volume of any regions of gas which have been separated from said permeable mold and sealed into said melt;

(5) examining whether or not said total volume of any regions of gas is zero; and (6) if said total volume of any regions of gas is not zero repeating said computations with at least one of said initial data modified until said total volume of any regions of gas becomes zero.

10. The method according to claim 9, wherein said initial data modified in said step (6) for repeating the computations include a shape of said runner.

11. The method according to claim 10, wherein the initial data of shapes of said mold, said cavity and said runner are also given with respect to each element, and includes areas of interfaces between said mold and said cavity and said runner.

12. The method according to claim 9, wherein the initial data of said mold properties include a permeability of said mold.

13. The method according to claim 12, wherein sail initial data modified in said step (6) for repeating the computations include the permeability of said mold, which is modified by providing at least part of an external surface of said permeable mold with a less-permeable material.

14. The method according to claim 12, wherein said initial data modified in said step (6) for repeating the computations include the permeability of said mold, which is modified by changing the size of sand grains and a binder constituting said mold.

15. The method according to claim 9, wherein said initial data modified in said step (6) for repeating the computations include said velocity of the melt flowing into said runner.

* * * * *